(No Model.)

T. R. HYDE, Jr.
BUTTON.

No. 582,065. Patented May 4, 1897.

Witnesses
J. F. Coleman
M. E. Ourand

Inventor
Theophilus R. Hyde Jr.
by W. H. Fincrel
Atty

UNITED STATES PATENT OFFICE.

THEOPHILUS R. HYDE, JR., OF WATERBURY, CONNECTICUT, ASSIGNOR TO THE SCOVILL MANUFACTURING COMPANY, OF SAME PLACE.

BUTTON.

SPECIFICATION forming part of Letters Patent No. 582,065, dated May 4, 1897.

Application filed September 30, 1896. Serial No. 607,467. (No model.)

*To all whom it may concern:*

Be it known that I, THEOPHILUS R. HYDE, Jr., a citizen of the United States, residing at Waterbury, in the county of New Haven and State of Connecticut, have invented a certain new and useful Improvement in Buttons, of which the following is a full, clear, and exact description.

This invention relates to that class of buttons which are secured in position by means of a metallic fastening, as distinguished from those buttons which are attached by sewing; and the invention relates more especially to that class of buttons in which the metallic fastening is made as a hollow rivet or eyelet.

The object of the invention is to provide a washer or base-flange for the button-head, between which and the head of the rivet the fabric is confined when the button is applied thereto, and also to provide means for conveniently applying the washer or base-flange to the button-head prior to and independently of the application of the fastening device, so that the user of the button has only two pieces to handle—namely, the button-head, with the flange permanently attached thereto, and the rivet or fastening.

The invention consists of a metallic button having a head and a shank or hub, to which latter a washer or base-flange is permanently secured, the said washer or base-flange being formed of a circular piece of metal with a central perforation and dished, and the shank or hub of the head being provided with integral prongs or spurs which are adapted to be passed through the hole in the washer and then turned or bent over within the raised portion thereof firmly to unite the button-head and washer.

Figure 1:
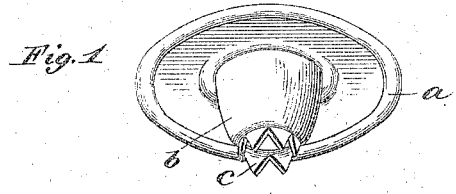
Figure 2:
Figure 3:
Figure 4:
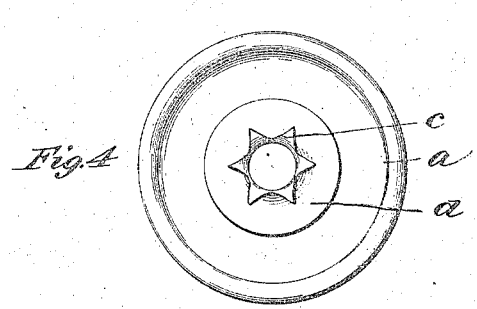
Figure 5:
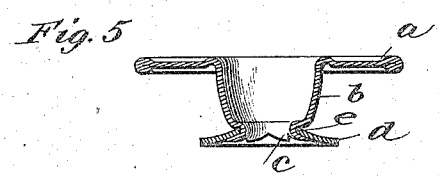
Figure 6:
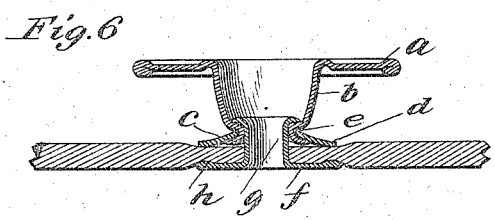

In the accompanying drawings, illustrating my invention, in the several figures of which like parts are similarly designated, Figure 1 is a perspective view of a button-head. Fig. 2 is a perspective view of a washer or base-flange, and Fig. 3 is a perspective view of the hollow rivet or eyelet. Fig. 4 is a bottom plan view of the completed button with the washer or base-flange attached, and Fig. 5 is a vertical section. Fig. 6 is a vertical section showing the button applied to a piece of fabric.

The head *a* of the button and its shank or hub *b* in the instance shown are made of metal and in one piece. In the manufacture of this form of button the bottom of the shank or hub is made whole, and then in order to form the prongs or spurs *c* for joining the washer or base-flange *d* to the button-head such whole bottom of the shank or hub is punched out, a proper tool being used for this purpose to insure the division of the metal of the bottom of the shank or hub into a number of such prongs or spurs.

The washer or base-flange *d* may be cut out of flat metal and provided with a central opening *e* and elevated—that is to say, dished about its central opening. The washer or base-flange thus formed is made to encircle the prongs or spurs *c* of the button-head, and then such prongs or spurs are turned back within and upon the under side of the washer or base-flange, as shown in Figs. 4, 5, and 6. The washer or base-flange thus applied forms a foot for the button, which, when the button is applied to a fabric or garment, constitutes a broad and stable base for the button.

The preferred form of metallic fastening is a hollow rivet *f*, whose tube *g* is passed up through the washer or base-flange and into the shank or hub of the button and then has its tube upset or clenched within the shank or hub, substantially as in Fig. 6. Thus the fabric will be confined between the flange *h* of the rivet and the washer or base-flange *d*.

Any suitable means may be employed for piercing the fabric or garment for the passage of the fastening device.

By means of the comparatively flat washer or base-flange *d* the button-head is provided with a base or foot which does not unduly elevate it and which may be applied to the button-head very readily and inexpensively when the integral fastening devices are employed. By using the integral fastening devices I am enabled to dispense with a separate eyelet which has heretofore been used to attach a base to a button, and by attaching the washer or base-flange to the button-head permanently there are only two members to be assembled in applying the button to the garment.

The washer or base-flange may be connected with the button shank or hub by first forming the latter with the prongs or spurs and then bending down the prongs or spurs within the said washer or base-flange, or the unpierced button-head and washer or base-flange may be properly arranged and then the shank or hub pierced and its prongs or spurs formed and projected through the central opening in the washer or base-flange and bent about the latter, thus forming the prongs or spurs and attaching the washer or base-flange to the button-head by a single operation.

What I claim is—

1. A button-head, having a shank or hub whose lower end is provided with integral prongs or spurs, and a washer or base-flange having a central opening arranged at said lower end of the shank or hub and connected therewith by the said prongs or spurs which are bent down upon the under side of the said washer or base-flange, the said washer being a fixed and permanent part of the button-head as well before as after it is set, substantially as described.

2. A button-head, having a shank or hub, and a dished washer or base-flange having a central opening and arranged at the lower end of said shank or hub, and fixedly and permanently connnected with it, before the button-head is set, by prongs or spurs, which are integral with the shank or hub and are projected through said central opening and bent over upon the said washer or base-flange, substantially as described.

3. A button, having a shank or hub, a washer or base-flange, integral prongs or spurs on said shank or hub bent over upon and permanently connecting the washer or base-flange therewith before the button is set or secured upon a garment, and a hollow rivet or eyelet for connecting the button with the garment, substantially as described.

In testimony whereof I have hereunto set my hand this 29th day of September, A. D. 1896.

THEOPHILUS R. HYDE, JR.

Witnesses:
M. L. SPERRY,
C. M. DEMOTT.